(12) United States Patent
Ogura (10) Patent No.: US 12,486,414 B2
(45) Date of Patent: Dec. 2, 2025

(54) COMPOSITE COLORED PARTICLE

(71) Applicant: MITSUBISHI PENCIL COMPANY, LIMITED, Tokyo (JP)

(72) Inventor: Kosuke Ogura, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 677 days.

(21) Appl. No.: 17/806,586

(22) Filed: Jun. 13, 2022

(65) Prior Publication Data
US 2022/0396707 A1    Dec. 15, 2022

(30) Foreign Application Priority Data

Jun. 14, 2021   (JP) .................................. 2021-098526

(51) Int. Cl.
*C09D 11/17*    (2014.01)

(52) U.S. Cl.
CPC .................................... *C09D 11/17* (2013.01)

(58) Field of Classification Search
CPC ........ C09D 11/18; C09D 11/17; C09C 1/0081
See application file for complete search history.

(56) References Cited

U.S. PATENT DOCUMENTS

| | | | | |
|---|---|---|---|---|
| 5,344,487 A | * | 9/1994 | Whalen-Shaw | C08K 9/08 501/141 |
| 5,454,864 A | * | 10/1995 | Whalen-Shaw | C08K 9/08 501/141 |
| 6,635,319 B1 | * | 10/2003 | Sunderrajan | B41M 5/52 428/32.37 |
| 2009/0162638 A1 | * | 6/2009 | Buri | C09B 67/0013 428/407 |
| 2025/0059390 A1 | * | 2/2025 | Nabe | C09D 11/38 |

FOREIGN PATENT DOCUMENTS

| | | | | |
|---|---|---|---|---|
| EP | 0 819 737 A2 | | 1/1998 | |
| EP | 2662419 A1 | * | 11/2013 | ............. C08L 1/286 |
| EP | 3505577 A1 | * | 7/2019 | ............... B43K 7/00 |
| JP | 2000-336315 A | | 12/2000 | |
| JP | 2006028371 A | * | 2/2006 | |
| JP | 2009-161678 A | | 7/2009 | |
| JP | 2012021055 A | * | 2/2012 | |

(Continued)

OTHER PUBLICATIONS

Machine English translation of Iwasa A, JP-2006028371-A, Feb. 2, 2006. (Year: 2025).*

(Continued)

*Primary Examiner* — Coris Fung
*Assistant Examiner* — Caroline D. Liott
(74) *Attorney, Agent, or Firm* — Oblon, McClelland, Maier & Neustadt, L.L.P.

(57) ABSTRACT

A composite colored particle may include a resin particle carrying a positive electric charge on a particle surface, a colored particle carrying a negative electric charge on a particle surface, and a low-density particle, the colored particle and the low-density particle forming a composite with the resin particle through Coulomb force. A water-based ink composition may contain such composite colored particles dispersed in a water-based medium. A writing instrument may be loaded with such a water-based ink composition.

15 Claims, 2 Drawing Sheets

(56) References Cited

FOREIGN PATENT DOCUMENTS

| | | | |
|---|---|---|---|
| JP | 2018203834 A * | 12/2018 | |
| JP | 2019011397 A * | 1/2019 | |
| JP | 2021-8595 A | 1/2021 | |
| JP | 2021-31679 A | 3/2021 | |
| WO | WO-2007009818 A1 * | 1/2007 | ........... A61K 8/0225 |
| WO | WO 2010/071185 A1 | 6/2010 | |
| WO | WO 2022/186228 A1 | 9/2022 | |

OTHER PUBLICATIONS

Machine English translation of Akiyama K, JP-2019011397-A, Jan. 24, 2019. (Year: 2025).*
Machine English translation of Asada K, JP-2012021055-A, Feb. 2, 2012. (Year: 2025).*
Machine English translation of Akiyama K, JP-2018203834-A, Dec. 27, 2018. (Year: 2025).*
Extended European Search Report issued on Oct. 19, 2022 in European Patent Application No. 22177970.5, 7 pages.

* cited by examiner

COMPOSITE COLORED PARTICLE

CROSS-REFERENCE TO RELATED APPLICATIONS

The present application is claims the benefit of the filing date of Japanese Appl. No. 2021-098526, filed on Jun. 14, 2021, the content of each of which is incorporated by reference.

BACKGROUND OF INVENTION

Technical Field of Invention

The present invention relates to an ink composition for a writing instrument, a coloring material contained therein, and a writing instrument loaded with this.

Description of Background Art

For ink for writing instruments, an ink composition in which various dyes or pigments, which are coloring materials, are dissolved or dispersed in a solvent is used. When writing instruments, including ballpoint pens and marking pens for example are stored for a long period of time without use, the coloring material contained in the ink composition may settle out, causing changes in density, and writing with such a writing instrument may result in fading or thinning of the marking. To prevent the changes in marking density from happening due to the settling out of ink composition component following prolonged storage, the dispersion stability of the coloring material contained in the ink composition is required.

Patent Document 1 describes a water-based ink composition for a ballpoint pen loaded with a coloring material, water, and a polysaccharide complex, the polysaccharide complex including a plurality of polysaccharides comprising at least two kinds of monosaccharides as constituent monosaccharides. According to this, a water-based ink composition for a ballpoint pen, as well as a ballpoint pen containing the water-based ink composition is provided, the water-based ink composition having shear thinning property, and capable of lessening ink separation and reduction of marking density by suppressing settling out and aggregating of a pigment without excessively increasing the ink viscosity even when the pigment is used for a coloring material, and that enables formation of clear marking without thinning, cracking, or blurring for a long term.

Furthermore, Patent Document 2 describes a water-based ink composition for a writing instrument, the water-based ink composition containing at least a pigment, water, and galactoxyloglucan that does not partially have a side chain galactose. According to this, a water-based ink composition for a writing instrument, as well as a writing instrument containing the water-based ink composition is provided, wherein the viscosity of the ink does not decrease due to external heat, nor does the pigment agglomerate or settle out that results in a lighter or darker coloration of the marking. In particular, when a writing instrument is carried in a chest pocket of clothes (chest-pocket insertion) with a tip portion of the writing instrument facing upward (in upright position), or when the writing instrument is transported during the summer, it is subjected to external heat and vibration, but the ink viscosity does not decrease, nor does the pigment aggregate or settle out so that the marking is not thinned or does not lighten in color. And the water-based ink composition exhibiting excellent dispersion stability of a pigment in a temperature range exceeding a living environment temperature range is provided.

The methods described in these documents all focus on a water-based medium contained in the ink composition and attempt to improve the physical properties of the medium so as to enhance the dispersion stability of the pigment, and are not inventions that attempt to improve the dispersion stability of the pigment itself.

CITATION LIST

Patent Document

Patent Document 1: JP 2021-008595 A, pp. 3-4
Patent Document 2: JP 2021-031679 A, pp. 3-4

SUMMARY OF INVENTION

An object of the present invention is to provide a water-based ink composition with excellent dispersion stability over time by suppressing a coloring agent from settling out during ink storage, and a writing instrument having excellent writing performance and blurring resistance. Furthermore, another object of the present invention is to provide a method of producing a composite colored particle that is blended as a coloring agent in the water-based ink composition.

Solution to Problem

As a result of diligent research on dispersion stability of colorants used, the inventor of the present invention has come up with an idea of using the Coulomb force to form a composite of a resin particle, a colorant particle, and a low-density particle, and thus completed the present invention.

That is, the present invention relates to a composite colored particle including a resin particle carrying a positive electric charge on a particle surface, a colored particle carrying a negative electric charge on a particle surface, and a low-density particle carrying a negative electric charge on a particle surface, the resin particle, the colored particle, and the low-density particle forming a composite through the Coulomb force.

And the present invention relates to a water-based ink composition in which the composite colored particles are dispersed in a water-based medium, and a writing instrument loaded with the water-based ink composition.

Furthermore, the present invention relates to a method of producing a composite colored particle, the method including forming a composite by mixing a resin emulsion containing a resin particle carrying a positive electric charge on a particle surface, a dispersion containing a colored particle carrying a negative electric charge on a particle surface, and a dispersion containing a low-density particle carrying a negative electric charge on a particle surface.

Note that, in the present invention, the Coulomb force refers to an attractive force (electrostatic force) that exerted on charged particles with positive and negative electric charge signs. Furthermore, "carrying a positive (or negative) electric charge on a particle surface" means that the particle has a positive (or negative) electric charge at least on its surface and includes a case where only the particle surface has a positive (or negative) electric charge, and also a case where the particle surface has a positive (or negative)

electric charge because the inside of the particle has a positive (or negative) electric charge.

Advantageous Effects of Invention

According to the present invention, a colorant having improved dispersion stability can be obtained. The ink composition containing the composite colored particles of the present invention exhibits excellent dispersion stability, writing performance, and blurring resistance. As a result, an ink composition having excellent long-term dispersion stability, as well as a writing instrument including a ballpoint pen and a marking pen, for example, with excellent writing performance and blurring resistance is provided. A writing instrument loaded with the ink composition according to the present invention exhibits excellent writing performance, and even when the writing instrument is stored without use for a long term, changes in marking density do not occur and the marking is not thinned. Furthermore, according to the present invention, composite colored particles having excellent dispersion stability that are blended in the ink composition, and a production method suited for the industrial production are provided.

BRIEF DESCRIPTION OF DRAWINGS

FIG. 1 illustrates that a composite colored particle of the present invention having a large particle size is formed by making colored particles 1 carrying a negative electric charge on particle surfaces and low-density particles 2 carrying a negative electric charge form a composite on a particle surface of a resin particle 3 carrying a positive electric charge on a particle surface through the Coulomb force.

DETAILED DESCRIPTION OF INVENTION

The composite colored particle of the present invention is a stable composite particle having a structure, in which colored particles carrying a negative electric charge on a particle surface (hereinafter, also referred to as anionic colored particle) and low-density particles carrying a negative electric charge on a particle surface (hereinafter, also referred to as anionic low-density particle) are bonded to a resin particle carrying a positive electric charge on a particle surface (hereinafter, also referred to as cationic resin particle) through the Coulomb force.

An embodiment of the present invention is described below in detail. However, in the present invention, components may be added or modified within a range that does not deviate from the gist of the present invention, and the technical scope of the present invention is not limited to the described embodiments and includes the invention described in the claims and equivalents thereof.

Note that, in the present invention, the particle size distribution of the cationic resin particles and the composite colored particles can be measured by a laser diffraction analysis. The particle size distribution of the anionic colored particles can be measured by a dynamic light scattering analysis.

Cationic Resin Particle

The resin particle used in the present invention is a resin particle carrying a positive electric charge on a particle surface (cationic resin particle). Such a resin particle includes a polymer modified with a cationic group, and specific examples include a resin particle in which a positive electric charge is imparted by attaching or reacting a reagent to the resin particle, and a resin particle in which a monomer containing a functional group carrying a positive electric charge or a precursor thereof are allowed to coexist in the preparation of the resin particle and thus the formed polymer is cationized.

As the resin particle used in the present invention, a resin particle containing a polymer having a cationic group is preferably used. It is preferable that the polymer mainly contains at least one type of polymer selected from the group consisting of a vinyl acetate-based resin, an acrylic resin, and a urethane-based resin that is modified with a cationic group.

Cationic Resin Particle of Vinyl Acetate-Based Resin

The cationic resin particles of the vinyl acetate-based resin are preferably cationic resin particles polymerized by adding a cationic auxiliary agent, such as a cationic monomer or a cationic emulsifying agent, in addition to the vinyl acetate monomer. For example, production is performed by using a cationic emulsifying agent, forming protective colloid using a polymer having a cationic group, or adding a cationic monomer to perform inverse emulsion polymerization, in the process of polymerization using a vinyl acetate monomer alone or a mixture of a vinyl acetate monomer and a comonomer that is copolymerizable with the vinyl acetate monomer, such as vinyl chloride or a (meth)acrylic monomer.

Preferably, the cationic resin particles of the vinyl acetate-based resin can be produced by emulsion polymerization using a cationic surfactant as a cationic emulsifying agent. Examples of the cationic surfactant include alkyl benzyl ammonium chloride, such as tetradecyl dimethyl benzyl ammonium chloride and octadecyl dimethyl benzyl ammonium chloride; alkyl pyridinium ammonium chloride, such as lauryl pyridinium chloride; tetraalkyl ammonium chloride, such as stearyl trimethyl ammonium chloride and dioleyl dimethyl ammonium chloride; EO addition type ammonium chloride having an alkyl group having 8 to 18 carbons and having the molar quantity of ethylene oxide addition of 2 to 15 times, such as alkyl bis(2-hydroxyethyl) methyl ammonium chloride and polyoxyethylene alkyl methylammonium chloride. The amount of the cationic surfactant used in the emulsion polymerization is preferably 1 to 10 parts by mass, and more preferably 2 to 5 parts by weight, per 100 parts by mass of the monomer.

Furthermore, after emulsion polymerization is performed by using a nonionic surfactant, a cationic substance, such as a cationic surfactant, polyoxyethylene alkyl amine, polyethylenimine, etc. is added to produce cationic resin particles of a vinyl acetate-based resin.

Furthermore, cationic resin particles of a vinyl acetate-based resin can be produced by quaternization by an alkylating agent after copolymerization is performed by adding an amino group-containing monomer such as N-substituted amino alkyl(meth)acrylate, such as dimethylaminoethyl (meth)acrylate or diethylaminoethyl (meth)acrylate, or an N-substituted amino alkyl (meth)acrylamide, such as dimethylaminopropyl (meth)acrylamide in a (meth)acrylic monomer or a mixture of a (meth)acrylic monomer and a styrene-based comonomer. As the alkylating agent, an alkyl halide such as octyl chloride, octyl bromide, dodecyl chloride, dodecyl bromide, tetradecyl chloride, tetradecyl bromide, hexadecyl chloride, or hexadecyl bromide is used.

Cationic Resin Particle of Acrylic Resin

The cationic resin particles of the acrylic resin are preferably cationic resin particles polymerized by adding a cationic auxiliary agent, such as a cationic monomer or a cationic emulsifying agent, in addition to the acrylic monomer. For example, production is performed by using a cationic emulsifying agent, forming protective colloid using a polymer having a cationic group, or adding a cationic monomer to perform inverse emulsion polymerization, in the process of polymerization using (meth)acryl monomers alone or a mixture of a (meth)acryl monomer and a comonomer that is copolymerizable with (meth)acryl monomer.

Preferably, the cationic resin particles of the acrylic resin can be produced by emulsion polymerization using a cationic surfactant as a cationic emulsifying agent. Examples of the cationic surfactant include alkyl benzyl ammonium chloride, such as tetradecyl dimethyl benzyl ammonium chloride and octadecyl dimethyl benzyl ammonium chloride; alkyl pyridinium ammonium chloride, such as lauryl pyridinium chloride; tetraalkyl ammonium chloride, such as stearyl trimethyl ammonium chloride and dioleyl dimethyl ammonium chloride; EO addition type ammonium chloride having an alkyl group having 8 to 18 carbons and having the molar quantity of ethylene oxide addition of 2 to 15 times, such as alkyl bis(2-hydroxyethyl)methyl ammonium chloride and polyoxyethylene alkyl methylammonium chloride. The amount of the cationic surfactant used in the emulsion polymerization is preferably 1 to 10 parts by mass, and more preferably 2 to 5 parts by weight, per 100 parts by mass of the monomer.

Furthermore, after an acrylic monomer is emulsion-polymerized by using a nonionic surfactant, a cationic substance, such as a cationic surfactant, polyoxyethylene alkyl amine, polyethylenimine, etc. is added to produce cationic resin particles of an acrylic resin.

Furthermore, cationic resin particles of an acrylic resin can be also produced by quaternization by an alkylating agent after copolymerization is performed by adding an amino group-containing monomer such as N-substituted amino alkyl(meth)acrylate, such as dimethylaminoethyl (meth)acrylate or diethylaminoethyl (meth)acrylate, or an N-substituted amino alkyl (meth)acrylamide, such as dimethylaminopropyl (meth)acrylamide in a (meth)acrylic monomer or a mixture of a (meth)acrylic monomer and a styrene-based comonomer. As the alkylating agent, an alkyl halide such as octyl chloride, octyl bromide, dodecyl chloride, dodecyl bromide, tetradecyl chloride, tetradecyl bromide, hexadecyl chloride, or hexadecyl bromide is used.

Cationic Resin Particle of Urethane-Based Resin

As the cationic resin particles of a urethane-based resin, cationic resin particles of a urethane-based resin having a quaternary ammonium group are preferred. For this cationic resin particles, for example, cationic resin particles of a urethane-based resin having a quaternary ammonium group can be produced by producing a dispersion liquid of polyurethane by reacting a polyol, a polyisocyanate, and a tertiary amino group-containing polyol in a solvent or without a solvent, and then subjecting the tertiary amino group in the polyurethane to protonation by an acid or quaternization by an alkylating agent.

As another production method, after a urethane prepolymer having an isocyanate group at a terminal is produced by reacting a predetermined ratio of a polyol, a polyisocyanate, and a tertiary amino group-containing polyol in a solvent or without a solvent, the chain of the urethane prepolymer is elongated by using a polyamine, and a dispersion liquid of the urethane resin particles is produced. Then, the tertiary amino group in the urethane resin is subjected to protonation by an acid or quaternization by an alkylating agent. By this, the cationic resin particles of the urethane-based resin having the quaternary ammonium group are produced.

The alkylating agent for quaternization of the tertiary amino group is a reagent that produces a quaternary ammonium cation by adding an alkyl group to an amino group. An alkyl halide such as octyl chloride, octyl bromide, dodecyl chloride, dodecyl bromide, tetradecyl chloride, tetradecyl bromide, hexadecyl chloride, or hexadecyl bromide is preferably used.

The cationic resin particles used in the present invention are preferably cationic resin particles having less content of fine particles and having a uniform particle size. Specifically, in the particle size distribution, preferably at least 95% of the particles are particles having a particle size within a range of 0.1 μm to 3.0 μm, and more preferably at least 95% of the particles are particles having a particle size within a range of 0.1 μm to 2.0 μm.

Anionic Colored Particle

In the present invention, the colored particle carrying a negative electric charge on a particle surface (anionic colored particle) is used. This includes a resin particle carrying a negative electric charge on a particle surface and containing a dye (hereinafter, also referred to as anionic dye particle), and a pigment particle carrying a negative electric charge on a particle surface (hereinafter, also referred to as anionic pigment particle).

As the anionic colored particle used in the present invention, an anionic colored particle having a particle size of any appropriate choice can be used; however, a fine particle having a particle size of 0.01 to 1.0 μm, and particularly 0.05 to 0.5 μm, is preferred, and more preferably at least 95 mass % of the anionic colored particles are fine particles having a particle size within a range of 0.01 to 0.5 μm, and particularly 0.05 to 0.3 μm.

The particle sizes in this range are preferable in order to form good composite colored particles by combination with the cationic resin particles. The shape of the anionic colored particle is preferably spherical and particularly preferably perfectly spherical.

Anionic Dye Particle

The anionic dye particle used in the present invention includes a particle containing a dye inside or on a surface of an anionic resin particle and a particle containing an anionic dye inside or on a surface of a resin particle, and is particularly preferably an anionic dye fine particle containing a dye in inside or on a surface of an anionic resin fine particle.

As the resin particle used in the production of the anionic dye particle containing a dye inside or on a surface of an anionic resin particle, a particle formed of a resin to which an anionic functional group (hereinafter, also referred to as anionic group) is chemically bonded or a particle containing a resin to which an anionic group is physically attached can be used.

As a resin constituting the anionic dye particle, a thermoplastic resin or a thermosetting resin can be used, and at least one type of resin selected from the group consisting of acrylic resins, urea-based resins, urethane-based resins, and urea-urethane-based resins can be preferably used. The structure of the resin may be straight-chain or branched.

In the production of the anionic dye particle, in a case where an anionic group is introduced to the resin particle, a reagent having an anionic group or a precursor thereof may be directly bonded to the resin or may be indirectly bonded to the resin with another atomic group interposing therebetween. Examples of another atomic group for bonding the anionic group and the resin include straight-chain or branched alkylene groups having 1 to 12 carbons, phenylene groups, naphthylene groups, carbonyl groups, ester groups, ether groups, amide groups, amino groups, azo groups, and sulfonyl groups.

As the resin particle to be used in the production of the anionic dye particle and to which an anionic group is introduced, a particle formed of a resin composition obtained by polymerizing a monomer mixture containing a monomer having an anionic group or a monomer mixture containing an auxiliary agent, such as an emulsifying agent, having an anionic group together with a dye in a dissolved or dispersed state can be used. Furthermore, a particle having an anionic group formed on a particle surface by a chemical treatment of the resin particle can be also used. Examples of the anionic group include a carboxyl group, a sulfonic acid group, and a phosphoric acid group.

The acrylic resin having an anionic group can be obtained by, for example, performing polymerization by using a (meth)acrylic acid having a carboxyl group or a (meth)acrylate having an anionic group, such as a carboxyl group or a sulfonic acid group, as a monomer. The urea-based resin having an anionic group can be obtained by, for example, performing polymerization by using a compound having an anionic group for at least one selected from a combination of a polyisocyanate compound and a polyamine compound. The urethane-based resin having an anionic group can be obtained by, for example, performing polymerization by using a compound having an anionic group for at least one selected from a combination of a polyisocyanate compound and a polyol compound. The urea-urethane-based resin having an anionic group can be obtained by, for example, performing polymerization by using a compound having an anionic group for at least one type selected from a combination of a polyisocyanate compound, a polyamine compound, and a polyol compound.

The chemical treatment for introducing an anionic group in a resin surface can be performed by a method of introducing an anionic group such as a carboxyl group, a sulfonic acid group, or a phosphoric acid group by performing a coupling reaction of a resin by a diazonium salt.

Furthermore, by subjecting a resin to an oxidation treatment that is a gas phase method, a liquid phase method, or a combination of these, an anionic group such as a carboxyl group can be introduced. In a case where the oxidation treatment is performed by a gas phase method, examples thereof include a method by which a resin is oxidized by being brought into contact with ozone or oxygen as an oxidizing agent.

In the case where the oxidation treatment is performed by a liquid phase method, as the oxidizing agent, chlorine, hydrogen peroxide solution, nitric acid, sulfuric acid, chlorate, or persulfate can be used, and for example, by charging a resin in an aqueous solution containing the oxidizing agent, a resin having an anionic group on a surface can be obtained.

In the case where the anionic group is physically attached to a surface of a resin particle, examples of the method include a method of attaching an anionic polymer dispersing agent to a resin surface by supplying the anionic polymer dispersing agent in a dispersion liquid of resin particles, and a method in which resin particles are charged in an anionic reagent solution and then the solvent is removed to coat the resin surface with the anionic reagent.

As the dye to be used in the production of the anionic dye particle, any of the following, acidic dyes, basic dyes, direct dyes, and oil-soluble dyes can be used, and naturally-occurring dyes and synthetic dyes may also be used. Two or more types of non-anionic dyes or anionic dyes may be mixed, or a non-anionic dye and an anionic dye may be mixed for use.

Examples of the acidic dye include eosine, phoxine, acid red, water blue, brilliant blue FCF, and nigrosine.

Examples of the basic dye include di- or triarylmethane dyes, such as methyl violet; quinonimine dyes, such as azine-based (including nigrosine), oxazine-based, and thiazine-based quinonimine dyes; xanthene dyes, such as rhodamine; triazole azo dyes; thiazole azo dyes; benzothiazole azo dyes; azo dyes; methine dyes, such as polymethine-based, azomethine-based, and azamethine-based methine dyes; anthraquinone dyes; and phthalocyanine dyes. Among these, a water-soluble basic dye is preferred.

Examples of the direct dye include Direct Black 154 and Direct Sky Blue. Examples of the oil-soluble dye include monoazo, diazo, metal complex salt-type monoazo, anthraquinone, phthalocyanine, and triarylmethane. Also, halochromic oil-soluble dyes obtained by substituting functional groups of acid and basic dyes with hydrophobic groups can be used as well.

As the oil-soluble dye, examples of yellow oil-soluble dye include C. I. Solvent Yellow 114 and 116; examples of orange oil-soluble dye include C. I. Solvent Orange 67; examples of red oil-soluble dye include C. I. Solvent Red 122 and 146; examples of blue oil-soluble dye include C. I. Solvent Blue 5, 36, 44, 63, 70, 83, 105, and 111; examples of black oil-soluble dye include C. I. Solvent Black 3, 7, 27, and 29.

Examples of commercially available oil-soluble dyes include Blue Dye SBN Blue 701 (available from Hodogaya Chemical Co., Ltd.), Blue Dye Oil Blue 650 (available from Orient Chemical Industries Co., Ltd.), Blue Dye Savinyl Blue GLS (available from Clariant K. K.), Red Dye SOC-1-0100 (available from Orient Chemical Industries Co., Ltd.), OIL BLACK 860, OIL PINK 314, OIL YELLOW 3G, VALIFAST PINK 2310 N, VALIFAST RED 3312, VALIFAST YELLOW CGHN new, VALIFAST YELLOW 1108, and VALIFAST BLACK 3830 (available from Orient Chemical Industries Co., Ltd.).

In the anionic dye particles, 0.2 to 50 mass %, preferably 0.5 to 20 mass %, and more preferably 1.0 to 10 mass %, of the dyes can be contained with respect to the total amount of the anionic dye particles.

Anionic Pigment Particle

The pigment particle used in the present invention is a resin particle carrying a negative electric charge on a particle surface (hereinafter, also referred to as anionic pigment particle). As the pigment particle described above, a pigment particle formed of a solid pigment modified with an anionic group can be used.

As the anionic pigment particle, a particle containing an inorganic pigment as a main component and a particle containing an organic pigment as a main component can be used. Examples of the inorganic pigment include titanium oxide-based, iron oxide-based, metal powder-based, calcined substance-based, and extender-based pigments. Examples of the organic pigment include azo-based, phthalocyanine-based, quinacridone-based, anthraquinone-based, dioxadine-based, indigo/thioindigo-based, perinone/perylene-based, isoindolinone-based, aniline black-based, azo-methine azo-based, and carbon black-based pigments. A combination of an inorganic pigment and an organic pigment can be also used.

In the present invention, as the anionic pigment particle, an anionic pigment particle in which a reagent containing an anionic functional group (hereinafter, referred to as anionic group) or a precursor thereof is chemically bonded or physically attached to a particle surface of a pigment can be used. Also, as the anionic pigment particle, an anionic pigment particle in which an anionic group has been formed by subjecting the pigment particle surface to a chemical reaction can be used. Examples of the anionic group include a carboxyl group, a sulfonic acid group, and a phosphoric acid group.

In a case where an anionic group is allowed to be chemically bonded to the particle surface of the pigment, the anionic group may be directly bonded to a compound constituting the pigment or may be bonded to a compound constituting the pigment with another atomic group interposing therebetween. Examples of another atomic group for indirectly bonding the anionic group and a compound constituting the pigment include straight-chain or branched alkylene groups having 1 to 12 carbons, phenylene groups, naphthylene groups, carbonyl groups, ester groups, ether groups, amide groups, amino groups, azo groups, and sulfonyl groups.

In a case where an anionic group is physically attached to a particle surface of a pigment, the pigment surface is preferably treated with an anionic dispersing agent, or the pigment surface is preferably coated with, for example, an anionic resin.

An example of a method of surface-treating a pigment with a dispersing agent is a method in which an anionic macromolecular dispersing agent is fed to a dispersion liquid of a pigment and thus the anionic macromolecular dispersing agent is attached to the pigment surface.

Examples of a method of coating a pigment with a resin include a method, in which an anionic monomer is fed to a dispersion liquid of a pigment and polymerized and thus the pigment surface is covered, and a method, in which a pigment is charged in a solution of an anionic resin, then a solvent is removed, and thus the pigment surface is covered.

In a case where an anionic group is formed on a particle surface by chemical treatment of a pigment, the anionic group is formed by a chemical reaction of the pigment. Examples of the acid group to be introduced to the pigment surface include a sulfonic acid group, a phosphoric acid group, a carboxyl group, and a hydroxy group.

The chemical treatment by which the anionic group is introduced to the pigment surface can be performed by a gas phase method, a liquid phase method, or a method combining these.

In a case where the oxidation treatment is performed by a gas phase method, examples thereof include a method in which a pigment, such as carbon black, is oxidized by being brought into contact with ozone or oxygen as an oxidizing agent.

In a case where the oxidation treatment is performed by a liquid phase method, a hydrogen peroxide solution, nitric acid, sulfuric acid, chlorate, or persulfate can be used as the oxidizing agent. For example, by charging a pigment in an aqueous solution containing the oxidizing agent, and performing a stirring treatment, a pigment having an acid group on a surface can be obtained. By controlling the used amount of the oxidizing agent and the reaction temperature, the acid group can be uniformly introduced to the surface of the pigment such as carbon black.

Further examples include methods of introducing an anionic group, such as a sulfonic acid group, a phosphoric acid, or a carboxyl group, to a surface of a pigment, such as carbon black, by a coupling reaction by a diazonium salt; introducing an anionic group to a pigment surface by bringing the pigment into contact with a free oxygen at a high temperature; or introducing an anionic group to the pigment surface by treating the pigment surface with bromine and water under normal pressure or increased pressure.

Anionic Low-Density Particle

A low-density particle used in the present invention is a particle that has a negative electric charge on its particle surface and has a low apparent density. As the low-density particle, an organic or inorganic low-density particle can be used. One type of a low-density particle may be used alone, or two or more types of low-density particles may be used in combination.

The apparent density of the low-density particle is preferably 0.1 $g/cm^3$ to 1.4 $g/cm^3$, and more preferably 0.1 $g/cm^3$ to 1.0 $g/cm^3$. Apparent density according to the present invention refers to a mass of a particle with respect to an excluded volume of the particle in a liquid, and is equal to a true density in a case where the particle is a solid particle; however, in a case where the particle is a hollow particle, the volume occupied by a void is not excluded from the particle volume.

When the low-density particle is compounded to the composite colored particle through the Coulomb force, due to its low apparent density, the low-density particle can reduce an apparent density as an entire composite colored particle, and as a result, sedimentation of the composite colored particles in an ink composition can be prevented.

As an organic low-density particle, an anionic low-density resin particle can be used. The anionic low-density resin particle is a particle that is anionic on a particle surface and that is formed of a low-density resin. Examples of the low-density resin constituting the anionic low-density resin particle include polymers and copolymers containing an olefin, such as ethylene, propylene, or styrene. Examples of the anionic group include a sulfonic group, a carboxyl group, and a phosphoric acid group.

The anionic low-density resin particle can be obtained by, for example, a method of performing (co) polymerization by using at least some monomers having an anionic group. Furthermore, the anionic low-density resin particle can be obtained by a method of coating at least a part of the surface of the low-density resin particle with a material having an anionic group.

As the low-density resin particle, a solid particle formed of a low-density resin having no voids can be used. In this case, the density (true density) of the low-density resin constituting the solid particle is preferably lower and, specifically, is preferably 1.4 $g/cm^3$ or less, and particularly preferably 1.0 $g/cm^3$ or less. As the solid particle, use of polyolefin-based resin particles is preferred, and polyethylene-based particles and polypropylene-based particles are particularly preferred.

Furthermore, as the low-density resin particle, a hollow resin particle can be preferably used. The hollow resin particle is a resin particle having a hollow structure with a void in its inner part. The porosity of the hollow resin particle is preferably 20% or greater and 80% or less, and more preferably 35% or greater and 70% or less. In a case where a hollow particle is used, a low apparent density can be achieved. However, when the apparent density is extremely low and thus a thickness of the shell layer constituting the particle becomes thinner, breakage tends to occur and it becomes difficult to stably obtain a composite colored particle.

Examples of the structure of the hollow resin particle include a core-shell structure. The thickness of the shell layer of the core-shell structure is preferably 10 nm or greater and 20 nm or less, and more preferably 12 nm or greater and 15 nm or less. When the thickness of the shell layer of the hollow resin particle is 10 nm or greater, because the hollow structure is less likely to be broken, the density becomes stable, and thus the composite colored particle can be obtained. Furthermore, when the thickness of the shell layer of the hollow resin particle is 20 nm or less, the composite colored particle of small density can be obtained. The porosity of the hollow resin particle and the thickness of the shell layer of the core-shell structure are measured by using, for example, a scanning electron microscope (SEM) or a transmission electron microscope (TEM).

As the low-density resin particle, a commercially available anionic hollow resin particles can be used. Examples of commercially available products of the styrene-acrylic resins include product name: ROPAQUE OP-62 (average particle size: 450 nm, porosity: 33%), product name: ROPAQUE OP-84J (average particle size: 550 nm, porosity: 20%, solid content: 42.5%), product name: ROPAQUE OP-91, product name: ROPAQUE HP-1055 (average particle size: 1000 nm, porosity: 55%), product name: ROPAQUE HP-91 (average particle size: 1000 nm, porosity: 50%), and product name: ROPAQUE ULTRA (average particle size: 380 nm, porosity: 45%) (these are available from The Dow Chemical Company).

Examples of commercially available products of the crosslinking styrene-acrylic resin include product name: SX-863 (A), product name: SX-864 (B), product name: SX-866 (A), product name: SX-866 (B) (average particle size: 300 nm, porosity: 30%), and product name: SX-868 (average particle size: 500 nm) (these are available from JSR Corporation), and product name: ROPAQUE ULTRA E (average particle size: 380 nm, porosity: 45%) and product name: ROPAQUE ULTRA DUAL (average particle size: 380 nm, porosity: 45%) (these are available from The Dow Chemical Company). Examples of commercially available products of the modified styrene-acrylic resin include product name: Nipol MH5055 (average particle size: 500 nm) and product name: Nipol MH8101 (average particle size: 1 µm) (these are available from Zeon Corporation).

As the inorganic low-density particle, a hollow inorganic particle formed of an inorganic oxide having a hollow structure having an unfilled void in its inner part is preferred, and a hollow glass particle and a hollow silica particle are particularly preferred. The porosity of the hollow inorganic particle is preferably 20% or greater and 80% or less, and more preferably 35% or greater and 70% or less.

As the low-density particle of the present invention, a commercially available product of hollow inorganic particles can be used by imparting an anionic group thereto. Examples of commercially available products of the low-density inorganic particles include product name: SiliNax, which is a silica particle having a hollow structure in its inner part (available from Nittetsu Mining Co., Ltd.).

Examples of the method of imparting an anionic group to a surface of a hollow glass particle include a method, in which a surface of the commercially available hollow glass particle described above is at least partially coated by using a material, such as a resin, having an anionic group. Examples of the anionic group include a sulfonic group, a carboxyl group, and a phosphoric acid group.

Composite Formation

Figure 1:
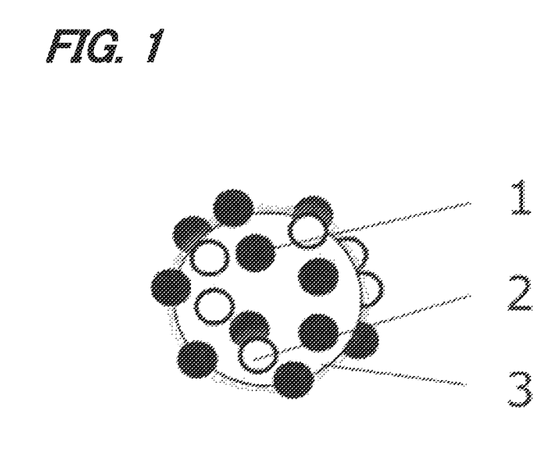
FIG. 1 is a schematic view for explaining an example of the present invention.
Figure 2:
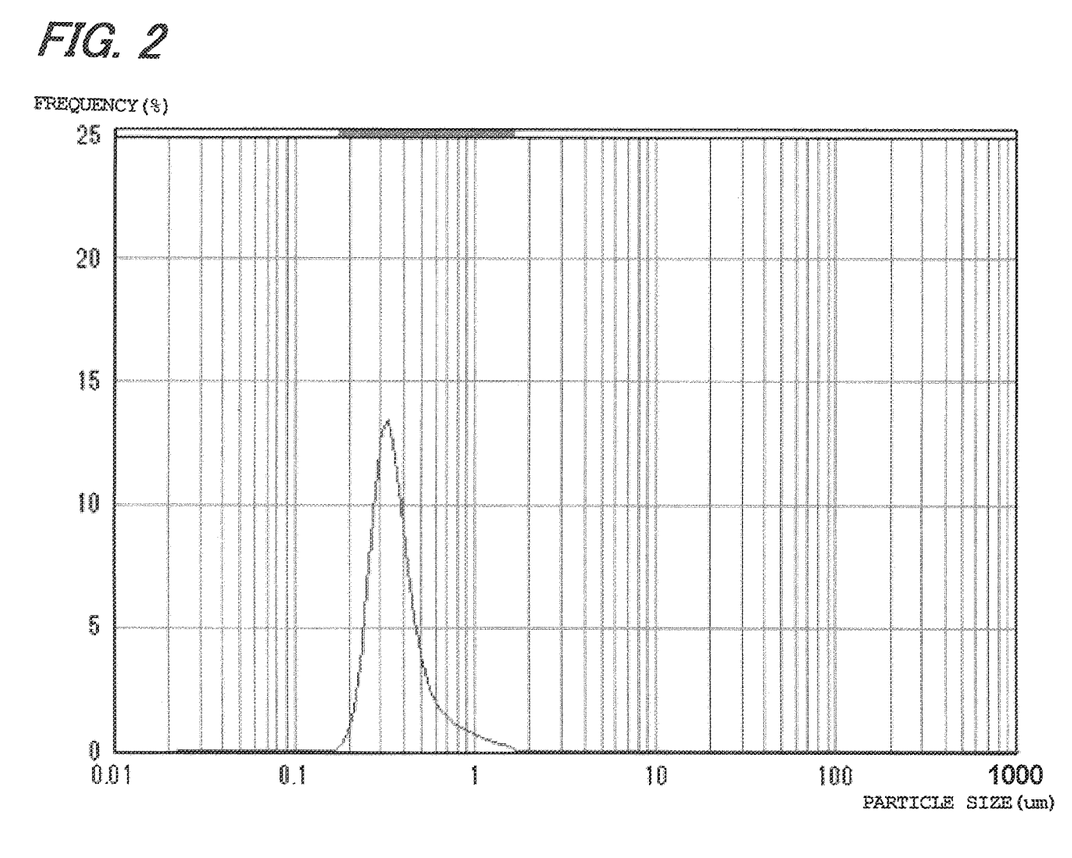
FIG. 2 is a particle-size frequency distribution of composite colored particles P-1 obtained by the steps of forming a composite and breaking up in Example 1.

In the present invention, a composite colored particle can be produced by combining a resin particle carrying a positive electric charge on a particle surface with a colored particle and an anionic low-density particle carrying a negative electric charge on a particle surface through the Coulomb force to form a composite. FIG. 1 schematically illustrates that a composite colored particle having a large particle size is formed by forming a composite with a cationic resin particle, anionic colored particles and anionic low-density particles through the Coulomb force.

The composite colored particles of the present invention can be produced by forming a composite by mixing a dispersion containing anionic colored particles and an emulsion containing anionic low-density particles with a resin emulsion containing cationic resin particles.

The blending ratio of the cationic resin particles to the anionic colored particles in the composite forming step is, in terms of mass ratio of cationic resin particles/anionic colored particles (excluding water-based medium and the like), is selected from a range of preferably 1/0.1 to 1/50, more preferably 1/0.5 to 1/10, and even more preferably 1/1 to 1/5. The blending ratio of the cationic resin particles to the anionic low-density particles is, in terms of mass ratio of cationic resin particles/anionic low-density particles (excluding water-based medium and the like), is selected from a range of preferably 1/0.1 to 1/50, more preferably 1/0.5 to 1/10, and even more preferably 1/1 to 1/5.

In the composite forming step, a resin emulsion containing cationic resin particles, a dispersion containing anionic colored particles, and an emulsion containing anionic low-density particles are prepared. Each of the emulsions and the dispersion is preferably a water-based emulsion in which particles are dispersed in a water-based medium. The density of the water-based medium to be used preferably has a density that is close to the density of the particles.

Each medium of the water-based emulsion is a water-based medium that is compatible to each other and is preferably water, a water-soluble organic solvent, or a mixed solution of these. The content of the water-based medium in each of the water-based emulsions is preferably 1 to 50 mass %, more preferably 3 to 30 mass %, and even more preferably 5 to 20 mass %, with respect to the total amount of the emulsion or the dispersion.

As the water-soluble organic solvent, monohydric or polyhydric alcohols such as alkylene glycol, polyalkylene glycol, glycol ether, acetin, and diacetin, lactams such as ε-caprolactam, 2-pyrrolidone, and N-methylpyrrolidone, lactones such as ε-caprolactone and δ-valerolactone, and sulfoxides such as dimethyl sulfoxide can be used.

Among the water-soluble organic solvents described above, polyhydric alcohols and lactams are preferred. Specific examples include propylene glycol, 1,3-butanediol, 1,2-hexanediol, 3-methoxy-3-methyl-1-butanol, 3-methoxy-1-butanol, 1-methoxy-2-propanol, 1-ethoxy-2-propanol, 1-butoxy-2-propanol, triethylene glycol monobutyl ether, and 2-pyrrolidone, and one type of these may be used alone, or two or more types of these may be mixed and used.

The anionic colored particle dispersion and the anionic low-density particle emulsion are then mixed in the cationic resin particle emulsion. The order of the mixing can be appropriately selected; however, it is preferable to mix the resin emulsion containing the cationic resin particles and the dispersion containing the anionic colored particles and then mix this and the emulsion containing the anionic low-density particles. The anionic colored particle dispersion and the anionic low-density particle emulsion can be separately mixed to the cationic resin particle emulsion; however, it is also preferable to mix the anionic colored particle dispersion and the anionic low-density particle emulsion in advance and then mix this with the cationic resin particle emulsion.

As the mixing method of emulsions, a method in which each emulsion is charged in a container equipped with a stirring equipment, such as a mechanical stirrer or a magnetic stirrer, and then stirred can be employed. At this time, a necessary component to form an ink composition may be added.

In the composite forming step, a composite colored particle having a large particle size is effectively formed by electrostatically bonding the cationic resin particles, the anionic colored particles, and the anionic low-density particles contained in each emulsion or dispersion through the Coulomb force. The composite colored particles obtained by this have extremely small content of fine colorant particles having a particle size of less than 0.1 μm, and this is effective to achieve the effect of the present invention.

At this time, some composite colored particles aggregate and may form a composite colored particle aggregate having an extremely large particle size of, for example, over 10 μm. Because an aggregate having an extremely large particle size causes problems, such as clogging of an ink or thinning, when used for a writing instrument, a breaking up step where the aggregate is crushed into dispersed composite colored particles is preferably added.

Examples of the breaking up step include a method of stirring using a stirrer such as homomixer, a disper, a mixer, an ultra mixer, or a homogenizer. By the breaking up step, aggregates having extremely large particle sizes are crushed and transformed into separate composite colored particles and form a suitable dispersion liquid of the composite colored particles. By adjusting the stirring conditions at the time of crushing of the aggregates, the particle size of the composite colored particle can be controlled.

The method of producing the composite colored particles described above can be suitably performed industrially.

In other words, a preferred embodiment of the method of producing the composite colored particle of the present invention is a method of producing a composite colored particle, comprising a composite forming step of mixing a resin emulsion containing a resin particle carrying a positive electric charge on a particle surface, a dispersion containing a colored particle carrying a negative electric charge on a particle surface, and an emulsion containing a low-density particle, and a breaking up step of crushing aggregates formed in the composite.

For the particle sizes of the composite colored particles of the present invention, in terms of the frequency of the particles, preferably at least 95% of the composite colored particles have a particle size within a range of 0.2 μm to 3.0 μm, and more preferably at least 95% of the composite colored particles have a particle size within a range of 0.2 μm to 2.0 μm. The content of the fine particles having a particle size less than 0.1 μm in the composite colored particles is preferably less than 3%, and more preferably less than 1%, as a frequency of the particles.

The apparent density of the composite colored particles of the present invention is preferably 0.6 g/cm$^3$ to 1.8 g/cm$^3$, more preferably 0.7 g/cm$^3$ to 1.4 g/cm$^3$, and even more preferably 0.8 g/cm$^3$ to 1.2 g/cm$^3$. The apparent density of the composite colored particles can be measured by, for example, a method of JIS Z 8807:2012.

Water-Based Ink Composition

The composite colored particles of the present invention are dispersed in a water-based medium containing another component that has been added based on required characteristics as a writing instrument (e.g., ballpoint pen, marking pen) and form a water-based ink composition for the writing instrument. Examples of such other component constituting the water-based medium include pH adjusters, thickeners, corrosion inhibitors, preservatives, antimicrobial agents, lubricants, and solvents as dispersion media.

The content of the composite colored particles of the present invention in the water-based ink composition is preferably 0.1 to 50 mass %, more preferably 1 to 30 mass %, and even more preferably 3 to 20 mass %, with respect to the total amount of the ink composition from the perspective of ensuring hue of the ink and preventing thinning at the time of writing.

Examples of the pH adjuster for adjusting the pH of the ink composition include amines such as monoethanolamine, diethanolamine, triethanolamine, triisopropanolamine, N, N-dimethylethanolamine, N, N-diethylethanolamine, and morpholine; ureas such as urea, thiourea, and tetramethylurea; allophanates such as allophanate and methyl allophanate; biurets such as biuret, dimethylbiuret, and tetramethylbiuret; quaternary ammoniums such as tetramethylammonium hydroxide; inorganic hydroxides such as sodium hydroxide, potassium hydroxide, and lithium hydroxide; and inorganic salts such as sodium (hydrogen) carbonate, potassium (hydrogen) carbonate, and lithium (hydrogen)carbonate; and at least one type of these can be used.

As the thickener to be blended in the water-based ink composition, for example, synthetic polymers, cellulose, and polysaccharides can be used. Specific examples thereof include gum arabic, gum tragacanth, guar gum, locust bean gum, alginic acid, carrageenan, gelatin, xanthan gum, welan gum, succinoglycan, diutan gum, dextran, methyl cellulose, ethyl cellulose, hydroxyethyl cellulose, carboxymethyl cellulose, starch glycolic acid and salts thereof, propylene glycol ester alginate, polyvinyl alcohol, polyvinylpyrrolidone, polyvinyl methyl ether, polyacrylic acid and salts thereof, carboxyvinyl polymers, polyethylene oxide, vinyl acetate-polyvinyl pyrrolidone copolymers, crosslinked acrylic acid polymers and salts thereof, uncrosslinked acrylic acid polymers and salts thereof, and styrene-acrylic acid copolymers and salts thereof, and at least one type of these can be used.

As the corrosion inhibitor to be blended in the water-based ink composition, benzotriazole, tolyltriazole, dicyclohexylammonium nitrite, and saponins can be used. As the preservative or antimicrobial agent to be blended in the water-based ink composition, phenols, benzoic acids, benzimidazoles, isothiazolones, triazines, bronopols, thiabendazoles, zinc pyrithiones, carbendazims, and omadines can be used.

Examples of the lubricant to be blended in the water-based ink composition include nonionic lubricants such as fatty acid esters of polyhydric alcohols, higher fatty acid esters of sugars, polyoxyalkylene higher fatty acid esters, alkyl phosphates, and alkylpolyoxyalkylene phosphates; anionic lubricants such as alkyl sulfonates of higher fatty acid amides and alkyl allyl sulfonates; fluorine-based lubricants; and silicone-based lubricants such as polyether-modified silicones.

Dispersion Medium

In the water-based ink composition, a water-based medium as a dispersion medium is blended to stabilize the dispersion state of the composite colored particles and to ensure usability as an ink for a writing instrument. The blended amount of the water-based medium in the water-based ink composition is preferably 3 to 300 parts by mass, and more preferably 5 to 100 parts by mass, per 100 parts by mass of the composite colored particles.

As the dispersion medium, water such as tap water, purified water, distilled water, or ion exchanged water, water-soluble organic solvents, or hydrophilic dispersion mediums formed of mixed solutions thereof can be used, and a mixed solution formed of water and at least one type of water-soluble organic solvents can be preferably used.

As the water-soluble organic solvent used in the water-based medium, for example, alcohols, glycols, and derivatives thereof can be used. Specific examples thereof include methanol, ethanol, propanol, butanol, ethylene glycol, diethylene glycol, triethylene glycol, propylene glycol, dipropylene glycol, polyethylene glycol, 3-butylene glycol, thiodiethylene glycol, ethylene glycol monomethyl ether, ethylene glycol monobutyl ether, diethylene glycol monomethyl ether, glycerin, and diglycerin, and at least one type of these can be used. A mixed solvent in which a water-soluble organic solvent is blended in a proportion of 5 to 200 parts by mass per 100 parts by mass of water is preferred.

Furthermore, as the dispersion medium, a hydrophilic nonionic polymer can be used. As the nonionic polymer to be blended in the water-based ink composition, for example, polyethers can be used. Specific examples thereof include polypropylene glycol, polybutylene glycol, and polyoxypropylene diglyceryl ether, and at least one type of these can be used. By using these nonionic polymers as a main solvent, occurrence of aggregation over time can be prevented.

As the polyethers such as polypropylene glycol and polybutylene glycol to be blended in the water-based ink composition, polyethers having various degrees of polymerization can be used. From the perspective of further exhibiting the effect of the present invention, as the polypropylene glycol, use of a polymer having a degree of polymerization of 400 to 700 (weight average) is preferred, and as the polybutylene glycol, use of a polymer having a degree of polymerization of 500 to 700 (weight average) is preferred.

The density of the water-based medium is preferably a density that is close to the apparent density of the composite colored particles to be blended. Specifically, the density is selected from 0.6 g/cm$^3$ to 1.8 g/cm$^3$, more preferably 0.7 g/cm$^3$ to 1.4 g/cm$^3$, and even more preferably 0.8 g/cm$^3$ to 1.2 g/cm$^3$. The combination of a water-based medium and composite colored particles having close densities is preferred to obtain a water-based ink composition for a writing instrument that suppresses sedimentation and separation of the colored particles in the ink during storage and that exhibits excellent dispersion stability over time.

The water-based ink composition for a writing instrument can be produced by, for example, blending predetermined amounts of the composite colored particles and the components to be blended in the water-based ink composition and stirring and mixing by a stirrer, such as a homomixer or a disper. Optionally, coarse particles in the water-based ink composition may be removed by filtration or centrifugation.

Writing Instrument

The water-based ink composition of the present invention is used by being filled in a felt-tip pen body having a fiber tip, a felt tip, or a plastic tip in a writing tip part, a marking pen body, or a ballpoint pen body having a ballpoint pen tip in a writing tip part, and the writing instrument having the water-based ink composition of the present invention is advantageous to exhibit excellent dispersion stability and writing performance.

EXAMPLES

The present invention will be described in further detail using examples, but the present invention is not limited to the examples and the like. Note that the unit "part (s)" in blending described below means "part (s) by mass".

Resin Particles

As the emulsion of the cationic resin particles, a water-based emulsion of each of cation-modified vinyl acetate-based resin, cation-modified acrylic resin, or cation-modified urethane-based resin was used.

(Resin particles A-1) As the cation-modified vinyl acetate-based resin, a cation-modified vinyl acetate-based resin emulsion (VINYBLAN 1008; available from Nissin Chemical Co., Ltd.) was used.

(Resin particles A-2) As the cation-modified acrylic resin, a cation-modified polyvinyl alcohol-acrylic resin emulsion (Mowinyl 6950; available from Japan Coating Resin Co., Ltd.) was used.

(Resin particles A-3) As the cation-modified urethane-based resin, a cation-modified urethane emulsion (SUPERFLEX 620; available from DKS Co., Ltd.) was used.

(Resin particles A-4) For the comparison, a nonionic modified vinyl acetate-based resin emulsion (VINYBLAN 1002; available from Nissin Chemical Co., Ltd.) was used.

Colored Particles

As the anionic colored particles, colored resin dispersions, in which anionic colored particles were dispersed in a water-based medium, obtained by the methods of Preparation Examples 1 to 3 described below were used.

Preparation Example 1 (Colored Particles B-1)

A 2-liter flask equipped with a stirrer, a reflux condenser, a thermometer, a nitrogen gas-inlet, and a 1000 mL separating funnel for addition of a monomer was set in a hot water bath, and charged with 329.5 parts of distilled water, 5 parts of glycerin monomethacrylate (BLEMMER GLM, available from NOF Corporation), 5 parts of sodium 2-sulfoethyl methacrylate (acrylic ester SEM-Na, available from Mitsubishi Chemical Corporation), 20 parts of a polymerizable surfactant (ADEKA REASOAP SE-10N, available from ADEKA Corporation, ether sulfate), and 0.5 parts of ammonium persulfate, and the internal temperature was increased to 50° C. while nitrogen gas was introduced.

Meanwhile, 40 parts of a metal complex-based oil-soluble dye (Savinyl Blue GLS, available from Clariant K.K.) and 10 parts of triallyl isocyanurate as a crosslinking agent (TAIC, available from Nippon Kasei Chemical Company Limited) were mixed with a mixed monomer consisting of 55 parts of cyclohexyl methacrylate monomer and 35 parts of n-butyl methacrylate as another monomer, and thus a solution was prepared. The prepared solution was added to the flask maintained at a temperature of about 50° C. from the separatory funnel over 3 hours with stirring to carry out emulsion polymerization. The polymerization was terminated after aging was further performed for 5 hours, and thus an emulsion of the anionic resin dye particles B-1 formed of anionic resin internally containing the dye was obtained.

The obtained anionic dye particles had a measured value of the zeta potential of −58 mV and were anionic. Furthermore, the average particle size of the obtained anionic dye particles was 0.04 μm.

Preparation Example 2 (Colored Particles C-1)

In a container, ion exchanged water, a water-soluble organic solvent, a viscosity modifier, a pH adjuster, a dispersing agent, and a pigment were successively added in the blending proportions described above and pre-mixed for 2 hours by using a stirrer. Dispersing treatment was performed by a 1 mm zirconia beads mill, impurities were removed by centrifugal separation, then filtration under reduced pressure was performed by using a microfilter (pore size: 5.0 μm; available from Millipore), and thus an emulsion of anionic resin-modified carbon black particles having a pH of 8.9 was obtained (C-1). The average particle size of the anionic resin-modified pigment particles C-1 formed of anionic resin-modified carbon black was 0.1 μm.

Pigment: Carbon black (MCF88; available from Mitsubishi Chemical Corporation) 10 mass %
Dispersing agent: α-Methylstyrene-acrylic copolymer (Joncryl 61J, available from Johnson, 30 mass % aqueous solution) 10 mass %
pH Adjuster: Aminomethyl propanol 0.1 mass %
Viscosity modifier: Polyvinylpyrrolidone 5 mass %
Water-soluble organic solvent: Propylene glycol monoethyl ether 5 mass %
Ion exchanged water 69.9 mass %

Preparation Example 3 (Colored Particles C-2)

As anionic pigment particles C-2 having a surface modified to be anionic, an emulsion of self-dispersing carbon black, in which an acid group was imparted to a surface of the carbon black (product name: CAB-O-JET 200; available from Cabot Specialty Inc.) was used.

Low-Density Particle

As anionic low-density particles, a low-density particle emulsion, in which anionic low-density particles were dispersed in a water-based medium, obtained by the methods of Preparation Examples 4 to 6 described below were used.

Preparation Example 4 (Low-Density Particles D-1)

As low-density particles D-1 formed of anionic solid resin particles, an emulsion of modified polyethylene resin particles that were anionic and that had a solid structure (product name: CHEMIPEARL A-100, available from Mitsui Chemicals, Inc., density: 0.89 g/cm$^3$) having a solid content concentration of 40% was prepared.

Preparation Example 5 (Low-Density Particles D-2)

As low-density particles D-2 formed of anionic hollow resin, an emulsion of crosslinking modified styrene-acrylic resin particles that were anionic and that had a hollow structure (product name: ROPAQUE ULTRA E, available from The Dow Chemical Company, porosity: 45%, refractive index: 1.6, volume average particle size: 500 nm) having a solid content concentration of 30% was prepared.

Preparation Example 6 (Low-Density Particles D-3)

As low-density particles D-3 formed of anionic hollow inorganic material, minute hollow spheres of silica having a hollow structure (product name: SiliNax, available from Nittetsu Mining Co., Ltd.; apparent density: 0.13 g/cm$^3$, particle size (median diameter): 130 nm, glass thickness: 15 nm) were used and mixed in the following composition to allow an anionic dispersing agent to be adsorbed, and thus an emulsion of anionic modified low-density particles D-3 to which anionic charge was imparted and which had a solid content concentration of 30 mass % was produced.

| Minute hollow sphere (product name: SiliNax, available from Nittetsu Mining Co., Ltd.) | 8 mass % |
|---|---|
| Joncryl 63J (available from BASF Japan) | 6 mass % |
| Bioden S (Nippon Soda Co., Ltd. ) | 0.2 mass % |
| Triethanolamine | 1.4 mass % |
| Propylene glycol | 15 mass % |
| Distilled water | Balance |

Examples 1 to 5 and Comparative Examples 1 and 2

In the combination and mass ratio (mass ratio of solid content) listed in Table 1, any one of the anionic colored particle emulsion B-1 or C-1 or C-2 prepared in Preparation Examples 1 to 3 was added and mixed in any one of the cationic resin particle emulsions A-1 to A-4 described above, then any one of the anionic low-density particle emulsions D-1 to D-3 prepared in Preparation Examples 4 to 6 was added (or not added) and mixed by using a stirrer, and thus each of water-based dispersions of R-1 to R-7 was obtained. Then, intense stirring was performed by using a homomixer and breaking up was performed, and thus the composite colored particles P-1 to P-5 containing the anionic low-density particles as Examples and the composite colored particles Q-1 and Q-2 containing no anionic low-density particles as Comparative Examples were each obtained in a water-based dispersion state having a solid content of 20 mass %.

Furthermore, for the composite colored particles that were produced in each of Examples 1 to 5 and Comparative Examples 1 and 2 and that were subjected to breaking up operation, the frequency distribution of the particle sizes was measured, and the frequency percentage (%) of the composite colored particles having a particle size within a specific range with respect to the entire composite colored particles was determined. The results are shown in Table 2.

According to the table, it is clear that the composite colored particles of the present invention were composed of particles having large particle sizes, and almost no fine dye-containing particles having small particle sizes were included.

Note that the particle size distributions of the cationic resin particles, cationic low-density resin particles, and the composite colored particles were measured by laser diffraction analysis using a particle size distribution analyzer (MICROTRAC HRA 9320-X100; available from Nikkiso Co., Ltd.). The particle size distribution of the anionic dye-containing particles was measured by a dynamic light scattering method using a concentrated particle size analyzer (FPAR-1000; available from Otsuka Electronics Co., Ltd.).

TABLE 1

Composition of composite colored particle (part by mass)

| | | Examples | | | | | Comparative Examples | |
|---|---|---|---|---|---|---|---|---|
| | | 1 | 2 | 3 | 4 | 5 | 1 | 2 |
| Resin particle | A-1 Cation-modified vinyl acetate-based resin | 30 | | 35 | | | | 30 |
| | A-2 Cation-modified acrylic resin | | | | 30 | | | |
| | A-3 Cation-modified urethane-based resin | | 25 | | | 25 | | |
| | A-4 Nonionic modified vinyl acetate-based resin | | | | | | 30 | |
| Colored particle | B-1 Dye-internally containing anionic resin | 40 | | | 50 | 50 | 40 | 40 |
| | C-1 Anionic resin-modified pigment | | 50 | | | | | |
| | C-2 Anionic modified pigment | | | 40 | | | | |
| Low-density particle | D-1 Anionic solid resin | 30 | | | | | | |
| | D-2 Anionic hollow resin | | 25 | 25 | | | | |
| | D-3 Anionic hollow inorganic material | | | | 20 | 25 | | |
| Composite colored particle | Number | P-1 | P-2 | P-3 | P-4 | P-5 | Q-1 | Q-2 |

TABLE 2

Frequency percentage of composite colored particles in specific particle size range

| | Example particle number | | | | | Comparative Example particle number | |
|---|---|---|---|---|---|---|---|
| Particle size range | P-1 | P-2 | P-3 | P-4 | P-5 | Q-1 | Q-2 |
| 0.2 μm to 3.0 μm | 100.00% | 98.20% | 99.30% | 100.00% | 99.40% | 97.40% | 99.30% |
| 0.2 μm to 2.0 μm | 100.00% | 96.50% | 97.60% | 99.50% | 97.10% | 95.70% | 97.50% |
| less than 0.1 μm | 0.00% | 0.30% | 0.30% | 0.00% | 0.20% | 0.50% | 0.40% |

Examples 11 to 19 and Comparative Examples 11 and 12

By using each of the emulsions of the composite colored particles P-1 to P-5 as Examples and the emulsions of the composite colored particles Q-1 and Q-2 as Comparative Examples, a pH adjuster, a thickener, a lubricant, a corrosion inhibitor, a preservative, and a dispersion medium were blended in the combination and the weight ratio listed in Table 3 and mixed, some aggregates were removed, and thus a dispersion of a water-based ink composition was prepared.

The ink compositions of Examples 11 to 19 are water-based ink compositions of the present invention. The ink composition of Comparative Example 11 is an example using no cationic resin particles, and the ink composition of Comparative Example 12 is an example using no anionic low-density particles.

Evaluation of Aqueous Ink Composition for Writing Instrument

Production of Ballpoint Pen

Ballpoint pens were produced by using the water-based ink compositions obtained in Examples 1 to 5 and Comparative Examples 1 to 5. Specifically, a refill having an ink containing tube formed of a transparent polypropylene (inner diameter: 3.8 mm, length: 113 mm) and a stainless steel tip having a hard metal ball having a diameter of 0.5 mm was prepared. To this, 0.8 g of each of the water-based ink compositions was filled, and an ink follower containing a mineral oil as a main component was filled at the rear end of the ink containing tube. The obtained refill was inserted into a body of a ballpoint pen (product name: Signo UM-100, available from Mitsubishi Pencil Co., Ltd.), and thus a ballpoint pen was produced.

Evaluation of Ink Composition

By using each ballpoint pen of Examples and Comparative Examples described above, the dispersion stability and writing performance were evaluated by the following evaluation methods.

(1) Evaluation of Dispersion Stability

Each of the ballpoint pens was capped and allowed to vertically stand still in a manner that the pen nib was facing downward in a room at 25° C. for 60 days. Thereafter, the refill was taken out, and the condition of the filled ink was observed and evaluated.

Evaluation Criteria for Dispersion Stability:
A: No aggregates were observed in any parts of the refill.
B: Aggregates in a slight amount were observed at a surface part or bottom part of the refill.
C: Large aggregate was observed at a surface part or bottom part of the refill.

(2) Evaluation of Writing Performance

Each of the ballpoint pens was capped and allowed to vertically stand still in a manner that the tip was facing downward in a room at 25° C. for 60 days. Then writing was performed on writing paper A that was in conformity with old JIS P 3201 by using a writing tester in conformity with ISO 141415-1, and the marking was evaluated. The writing conditions included the temperature of 20° C., angle of the pen of 70 degrees, load at the pen nib of 100 g, and writing speed of 4 m/min.

Evaluation Criteria for Marking:
A: No thinning or cracking of the marking was observed.
B: Thinning or cracking of the marking was partially observed.
C: Noticeable thinning or cracking of the marking occurred.

(3) Evaluation of Blurring Resistance

By using the ballpoint pen produced as described above, at 25° C. and 60% RH, a straight line was drawn at a writing angle of 60° under a load of 100 g on PPC paper, and at the end point of the drawing, the tip of the ballpoint pen was kept at the position for 10 seconds without being detached from the PPC paper surface, and then the ballpoint pen was removed from the paper surface. The maximum diameter of the ink left at the end point on the paper surface was measured by using a magnifying glass. The smallness of the measured diameter was taken as a degree of contact direct flow, and blurring resistance was evaluated based on the following evaluation criteria.

Evaluation Criteria:
- A: The diameter of the ink on the paper surface was less than 1.0 mm.
- B: The diameter of the ink on the paper surface was 1.0 mm or greater and less than 2.0 mm.
- C: The diameter of the ink on the paper surface was greater than 2.0 mm.

The evaluation results are shown in Table 3. Examples 11 to 19 each exhibited excellent dispersion stability and writing performance of the water-based ink composition, to which the composite colored particles of the present invention were blended.

TABLE 3

| | | Ink composition | | | | | | | | | | (part by mass) | |
|---|---|---|---|---|---|---|---|---|---|---|---|---|---|
| | | Examples | | | | | | | | | | Comparative Examples | |
| Component | Details | 11 | 12 | 13 | 14 | 15 | 16 | 17 | 18 | 19 | | 11 | 12 |
| Composite colored particle *4 | P-1 | 40 | | | | | | 30 | | | | | |
| | P-2 | | 40 | | | | | | 30 | | | | |
| | P-3 | | | 40 | | | | | | 30 | | | |
| | P-4 | | | | 40 | | | 10 | | | | | |
| | P-5 | | | | | 40 | | | 10 | | | | |
| | P-6 | | | | | | 40 | | | 10 | | | |
| | Q-1 | | | | | | | | | | | 40 | |
| | Q-2 | | | | | | | | | | | | 40 |
| pH modifier | Triethanolamine | 0.1 | 0.1 | 0.1 | 0.1 | 0.1 | 0.1 | 0.1 | 0.1 | 0.1 | | 0.1 | 0.1 |
| Thickener | Xanthan gum *1 | 0.3 | 0.3 | 0.3 | 0.3 | 0.3 | 0.3 | 0.3 | 0.3 | 0.3 | | 0.3 | 0.3 |
| Corrosion inhibitor | Benzotriazole | 0.3 | 0.3 | 0.3 | 0.3 | 0.3 | 0.3 | 0.3 | 0.3 | 0.3 | | 0.3 | 0.3 |
| Preservative | Benzoisothiazolone *2 | 0.3 | 0.3 | 0.3 | 0.3 | 0.3 | 0.3 | 0.3 | 0.3 | 0.3 | | 0.3 | 0.3 |
| Lubricant | Phosphate ester *3 | 0.3 | 0.3 | 0.3 | 0.3 | 0.3 | 0.3 | 0.3 | 0.3 | 0.3 | | 0.3 | 0.3 |
| Dispersion medium | Glycerin | 10 | 10 | 10 | 10 | 10 | 10 | 10 | 10 | 10 | | 10 | 10 |
| | Distilled water | 48.7 | 48.7 | 48.7 | 48.7 | 48.7 | 48.7 | 48.7 | 48.7 | 48.7 | | 48.7 | 48.7 |
| Evaluation of ink composition | Dispersion stability | A | A | A | A | A | A | A | A | A | | A | C |
| | Writing performance | A | A | A | A | A | A | A | A | A | | A | C |
| | Blurring resistance | A | A | A | A | A | A | A | A | A | | C | B |

*1: KELZAN S [available from Sansho Co., Ltd.]
*2: BIODEN 421 [available from Daiwa Chemical Industries Co., Ltd.]
*3: RB-410 [available from TOHO Chemical Industry Co., Ltd.], polyoxyethylene oleyl ether phosphate
*4: Dispersion having a solid content concentration of 20 mass %

INDUSTRIAL APPLICABILITY

The ink composition containing the composite colored particles of the present invention can be suitably used for uses in writing instruments, such as felt-tip pens, marking pens, and ballpoint pens. According to the present invention, the composite colored particles that impart excellent usability to the ink composition are advantageously produced industrially.

REFERENCE SIGNS LIST

1 Colored particle carrying a negative electric charge on a particle surface
2 Low-density particle carrying a negative electric charge on a particle surface
3 Resin particle carrying a positive electric charge on a particle surface

The invention claimed is:

1. A composite colored particle, comprising:
   a cationic resin particle carrying a positive electric charge on a particle surface;
   a colored particle comprising a resin particle carrying a negative electric charge on a particle surface and comprising a dye; and
   a low-density particle carrying a negative electric charge on a particle surface,
   wherein the colored particle and the low-density particle form a composite with the cationic resin particle through coulombic force, and
   wherein the low-density particle comprises (i) a solid particle comprising a low-density resin having no voids, (ii) a hollow resin particle having a hollow structure comprising a void in its inner part, or, (iii) a hollow inorganic particle comprising an inorganic oxide having a hollow structure comprising an unfilled void in its inner part.

2. The composite colored particle of claim 1, having an apparent density in a range of from 0.6 to 1.8 g/cm$^3$, wherein the apparent density refers to a mass of a particle with respect to an excluded volume of the particle in a liquid, and is equal to a true density in a case where the particle is a solid particle, however, in a case where the particle is a hollow particle, the volume occupied by a void is not excluded from the particle volume.

3. The composite colored particle of claim 1, wherein at least 95% of the composite colored particles have a particle size in a range of from 0.2 to 3.0 μm.

4. The composite colored particle according to of claim 1, wherein the low-density particle has an apparent density in a range of from 0.1 to 1.4 g/cm$^3$.

5. The composite colored particle of claim 1, wherein the low-density particle comprises a low-density resin comprising an anionic functional group.

6. The composite colored particle of claim 1, wherein the cationic resin particle carrying the positive a positive electric charge on the particle surface is a particle comprising a polymer comprising a cationic group.

7. The composite colored particle of claim 1, wherein the colored particle comprises a particle comprising an anionic resin comprising an acrylic resin, a urea-based resin, a urethane-based resin, and/or a urea-urethane-based resin, and a dye inside or on a surface of the particle comprising the anionic resin.

8. An ink composition, comprising:
the composite colored particle of claim 1 dispersed in a medium.

9. A writing instrument, comprising:
the ink composition of claim 8, loaded therein.

10. The composite colored particle of claim 1, wherein the colored particle has a particle size in a range of from 0.01 to 1.0 µm.

11. The composite colored particle of claim 1, wherein at least 95 mass % of the colored particle has a particle size in a range of from 0.01 to 0.5 µm.

12. The composite colored particle of claim 1, wherein the colored particle comprises an anionic resin particle and a dye inside or on a surface of the anionic resin particle.

13. The composite colored particle of claim 1, wherein the colored particle comprises the resin particle and an anionic dye inside or on a surface of the resin particle.

14. The composite colored particle of claim 1, wherein the low-density particle is the solid particle comprising the low-density resin having no voids.

15. The composite colored particle of claim 1, wherein the low-density particle is a hollow resin particle.

* * * * *